US012296755B2

(12) United States Patent
Usuki et al.

(10) Patent No.: US 12,296,755 B2
(45) Date of Patent: May 13, 2025

(54) MOUNTING STRUCTURE

(71) Applicant: HONDA MOTOR CO., LTD., Tokyo (JP)

(72) Inventors: Kodai Usuki, Tokyo (JP); Hiroyuki Sukigara, Tokyo (JP); Tadayoshi Iwase, Tokyo (JP); Hiromi Sato, Tokyo (JP); Arata Isobe, Tokyo (JP); Yoshito Terayama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 167 days.

(21) Appl. No.: 18/190,687

(22) Filed: Mar. 27, 2023

(65) Prior Publication Data
US 2023/0311783 A1  Oct. 5, 2023

(30) Foreign Application Priority Data

Mar. 30, 2022  (JP) ................................. 2022-057445

(51) Int. Cl.
*B60R 11/04* (2006.01)
*B60R 11/00* (2006.01)

(52) U.S. Cl.
CPC ........ *B60R 11/04* (2013.01); *B60R 2011/0022* (2013.01); *B60R 2011/005* (2013.01)

(58) Field of Classification Search
CPC ............ B60R 11/04; B60R 2011/0022; B60R 2011/005
USPC ........................................................ 348/148
See application file for complete search history.

(56) References Cited

U.S. PATENT DOCUMENTS

| | | | |
|---|---|---|---|
| 2005/0017486 A1* | 1/2005 | David | B60R 21/01538 280/735 |
| 2008/0165250 A1 | 7/2008 | Ekdahl et al. | |
| 2020/0231111 A1* | 7/2020 | Ghannam | H04N 23/57 |
| 2020/0346658 A1* | 11/2020 | Deng | B60W 40/09 |
| 2021/0001863 A1 | 1/2021 | Tsuda | |
| 2022/0014650 A1* | 1/2022 | Muramatsu | H04N 23/74 |
| 2022/0182518 A1 | 6/2022 | Imai et al. | |
| 2024/0198925 A1 | 6/2024 | Hirota | |

FOREIGN PATENT DOCUMENTS

| | | |
|---|---|---|
| CN | 105835787 A | 8/2016 |
| DE | 102008017835 A1 | 10/2008 |
| JP | 2004117249 A | 4/2004 |
| JP | 2004274154 A | 9/2004 |
| JP | 2017118439 A | 6/2017 |

(Continued)

OTHER PUBLICATIONS

Notice of Reasons for Refusal for Japanese Patent Application No. 2023-057445 dated Aug. 8, 2023; 7 pp.

*Primary Examiner* — Allen C Wong
(74) *Attorney, Agent, or Firm* — Armstrong Teasdale LLP

(57) ABSTRACT

A mounting structure (X), comprising: a cover (5) provided on an inboard side of a pillar (P) of a vehicle, and having an opening (15) facing inboard; an illuminating device (9) configured to illuminate interior of the vehicle via the opening; and an imaging device (11) configured to capture an image of the interior of the vehicle via the opening, wherein the illuminating device and imaging device are provided with respective working ends facing the interior of the vehicle which are positioned one above and inboard of another.

11 Claims, 3 Drawing Sheets

(56) References Cited

FOREIGN PATENT DOCUMENTS

| | | | |
|---|---|---|---|
| JP | 2018132824 | A | 8/2018 |
| JP | 2019156256 | A | 9/2019 |
| JP | 2020137053 | A | 8/2020 |
| JP | 7531712 | B2 | 8/2024 |

* cited by examiner

MOUNTING STRUCTURE

TECHNICAL FIELD

The present disclosure relates to a mounting structure, and more particularly, to a mounting structure for an illuminating device that illuminates a vehicle interior and an imaging device that images an occupant in the vehicle cabin.

BACKGROUND ART

In passenger vehicles, it is known to provide a light source that emits infrared light, and an imaging unit that captures an image of the driver from an obliquely front direction (see JP2019-156256A, for example). The imaging unit disclosed in JP2019-156256A is provided on an A-pillar of the vehicle positioned obliquely in front of the driver of the vehicle.

According to the prior art disclosed in JP2019-156256A, for the purpose of capturing an image of the driver's face, a light receiving unit (imaging device) and a light source (illuminating device) are positioned on the A pillar laterally next to each other. However, since the lateral width of the A-pillar is limited, at least one of the light receiving unit and the light source inevitably protrudes from the A-pillar toward the front windshield. This detracts the appearance of the cabin, and may even restrict the driver's field of view.

SUMMARY OF THE INVENTION

In view of such a problem of the prior art, a primary object of the present invention is to provide a mounting structure for mounting an imaging device for imaging an interior of a vehicle and an illuminating device for illuminating the interior of the vehicle that does not substantially obstruct the driver's view.

Another object of the present invention to provide a mounting structure that allows an imaging device to monitor the condition of the driver without obstructing the view of the vehicle driver, thereby improving traffic safety and developing a sustainable transportation system.

In order to solve such a problem, an aspect of the present invention provides a mounting structure (X), comprising: a cover (5) provided on an inboard side of a pillar (P) of a vehicle, and having an opening (15) facing inboard; an illuminating device (9) configured to illuminate interior of the vehicle via the opening; and an imaging device (11) configured to capture an image of the interior of the vehicle via the opening, wherein the illuminating device and imaging device are provided with respective working ends facing the interior of the vehicle which are positioned one above and inboard of another.

Thereby, the illuminating device and the imaging device can be arranged on the inboard side of the pillar so as to substantially line up vertically along the length of the pillar so that the illuminating device and the imaging device are prevented from protruding laterally from the pillar or into the field of view of the driver.

Preferably, in this mounting structure, the illuminating device and the imaging device are positioned within an outer profile (B) of the cover.

Since the cover is positioned within the outer profile of the pillar, and the illuminating device and the imaging device are positioned within the outer profile of the cover, the driver's field of view is favorably prevented from being obstructed.

Preferably, in this mounting structure, the cover includes a first vertical wall (33) having a first vertical surface (45) facing inboard, and a second vertical wall (37) having a second vertical surface (55) facing inboard, the second vertical surface being positioned below and outboard of the first vertical surface, one of the illuminating device and the imaging device being provided on the first vertical wall while the other is provided on the second vertical wall.

Since the illuminating device and the imaging device can be mounted directly on the first vertical wall and the second vertical wall, the aiming directions of these devices can be correctly aligned without requiring any complex structure.

Preferably, in this mounting structure, the cover further includes a first horizontal wall (31) extending inboard from an upper end of the first vertical wall, and a second horizontal wall (35) extending outboard from a lower end of the first vertical wall to an upper end of the second vertical wall.

By providing these horizontal walls, spurious light is prevented from entering the imaging device, and spurious light is prevented from being emitted from the illuminating device. Further, the illuminating device and the imaging device are protected from protruding from the outer profile of the pillar.

Preferably, in this mounting structure, the first horizontal wall defines a first lower surface (41) that slopes downward toward the first vertical wall, and the second horizontal wall defines a second lower surface (51) that slopes downward toward the second vertical wall.

Thereby, spurious light is prevented from entering the imaging device, and spurious light is prevented from being emitted from the illuminating device without substantially reducing the fields of illumination and image capture.

Preferably, in this mounting structure, at least one of the first horizontal wall and the second horizontal wall is contained within an outer profile of the pillar.

Thereby, the pillar is free from protrusions so that a favorable external appearance of the pillar can be ensured.

Preferably, in this mounting structure, the first horizontal wall defines a first upper surface (43) that inclines downward toward the first vertical wall, and the second horizontal wall defines a second upper surface (53) that inclines downward toward the second vertical wall.

Thereby, when moisture should deposit on the outboard surface of the mounting member, the moisture can be readily and spontaneously removed from the pillar.

Preferably, in this mounting structure, the illuminating device is provided on the first vertical wall, and the imaging device is provided on the second vertical wall.

By thus positioning the imaging device further away from the driver than the illuminating device, the field of view of the imaging device can be maximized. By positioning the illuminating device nearer to the driver than the imaging device, the illuminating power of the illuminating device can be maximized. Also, by positioning the imaging device lower than the illuminating device, the length of the cable for the imaging device that is drawn downward inside the hollow interior of the pillar can be minimized so that electromagnetic interferences on the cable for the imaging device can be minimized.

Preferably, in this mounting structure, the pillar comprises an A-pillar.

Thereby, the imaging device and the illuminating device are thereby located optimally for imaging the face of the driver.

Preferably, in this mounting structure, the cover is provided with a mounting portion (27) configured to mount a functional device (25) to a part of the pillar that is located below the imaging device. Thereby, a device such as an audio speaker can be conveniently mounted to the pillar without interfering with the imaging device and the illuminating device.

Preferably, in this mounting structure, the pillar being curved or tilted so that an upper part of the pillar is more inboard than a lower part thereof. If the pillar being curved or tilted as is often the case with an A-pillar, the advantages of the present invention can be further enhanced.

The present invention thus provides a mounting structure for mounting an imaging device for imaging the interior of the vehicle and an illuminating device for illuminating the interior of the vehicle that does not substantially obstruct the driver's view.

DESCRIPTION OF THE PREFERRED EMBODIMENT(S)

A mounting structure according to an embodiment of the present invention will be described in the following with reference to the FIGS. 1 and 2.

The mounting structure X according to the present embodiment is applied to a four-wheeled vehicle S, more particularly an automobile. The present invention is applied to an A-pillar of the vehicle in this disclosure, but may also be applied to any other pillar-like structure of the vehicle. In the following disclosure, the directions are defined from the view point of the driver of the vehicle. The terms such as "inboard" and "outboard" are used in a broad sense. More specifically, the term "inboard" may mean not only laterally inward of the vehicle, but also inward in the fore and aft direction, and quarter directions (oblique directions: directions other than fore and aft and lateral directions). The same is true with the term "outboard".

Figure 1:
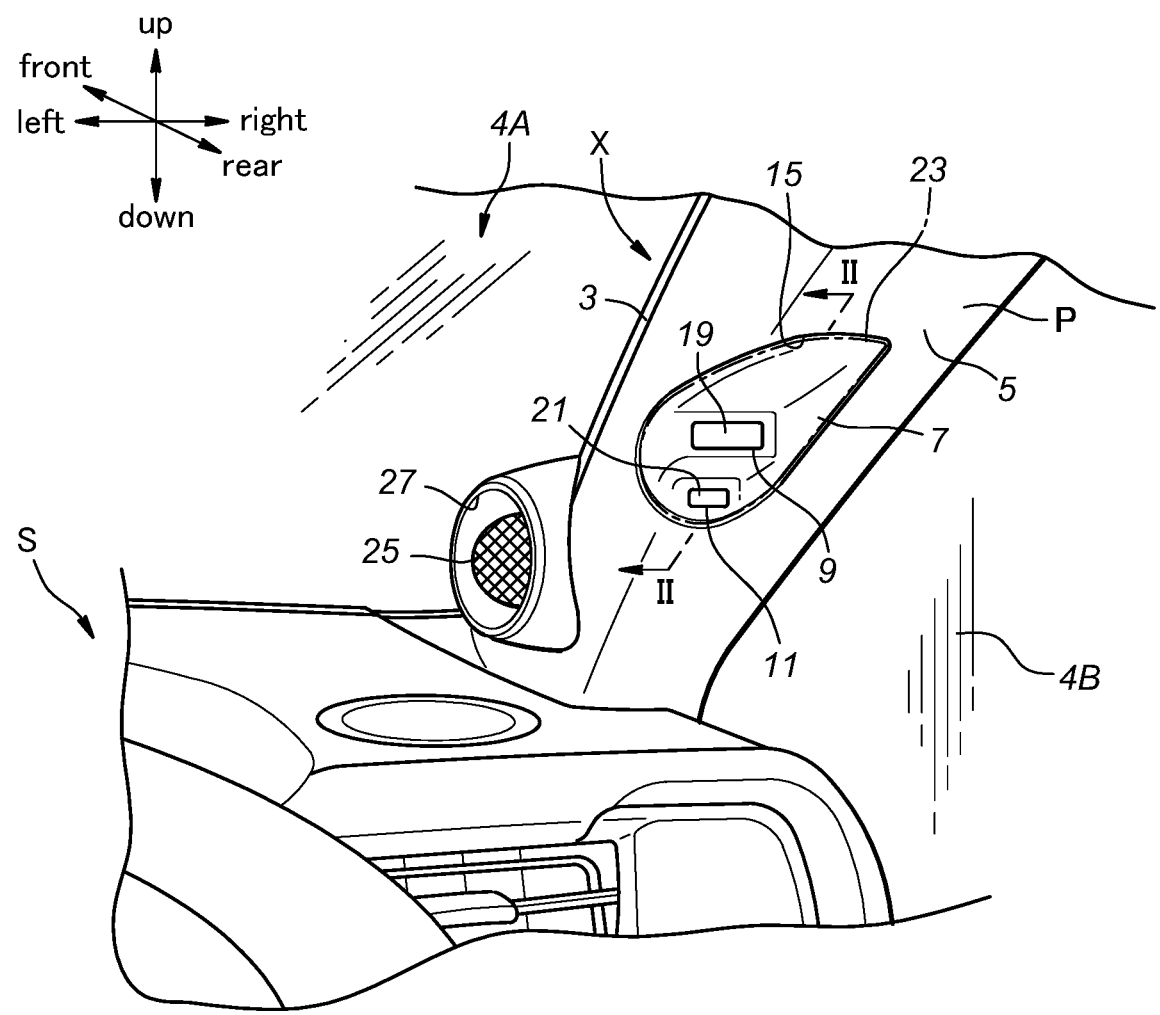
FIG. 1 is a perspective view of an A-pillar area of a vehicle fitted with a mounting structure according to an embodiment of the present invention.

Referring to FIG. 1, the mounting structure X includes a cover 5 mounted to a pillar body 3 consisting of a hollow steel structural member of the vehicle body from the inside of the vehicle. In this embodiment, the pillar body 3 separates a front windshield 4A and a side window 4B.

The cover 5 is provided with an opening 15 which is elongated along the length of the A-pillar, and the pillar body 3 is also provided with an opening substantially coinciding with the opening of the cover 5.

The cover 5 extends obliquely rearward and upward along the inboard surface of the pillar body 3. In this embodiment, the cover 5 is a molded product made of resin (for example, ABS resin). The cover 5 has a plate shape with lateral edges thereof curved outboard. The cover 5 is provided on the inboard side of the A-pillar P, and forms a part of the A-pillar P on the vehicle inner side.

The mounting structure further includes a retaining member 7 fitted to the opening 15 of the cover 5. The cover 5 and the retaining member 7 are both made of plastic sheet material having a substantially constant thickness, and may be considered as garnish members forming a part of the upholstery of the vehicle cabin. The middle part of the retaining member 7 is generally recessed into the hollow interior of the pillar body 3 as will be described hereinafter.

The retaining member 7 may be a member separate from the cover 5, and attached to the periphery of the opening of the cover 5 from the outboard side (from the side of the pillar body 3). Alternatively, the retaining member 7 may be integrally formed with the cover 5 or attached to the cover 5 from the inboard side. The retaining member 7 supports an illuminating device 9 and an imaging device 11 each having a working end facing the interior of the cabin, in particular the face of the vehicle driver. The term "working end" here may means an effective inboard end of the illuminating device 9 and the imaging device 11.

The illuminating device 9 is configured to emit electromagnetic energy such as visible light and infrared light from a light emitting surface 19 (working end) to illuminate the interior of the vehicle through the opening 15. The range illuminated by the illuminating device 9 may be, for example, the area of the driver's face. In this embodiment, the illuminating device 9 emits an infrared ray from the light emitting surface 19. In this embodiment, the illuminating device 9 includes a light emitting diode 9A (LED) that emits an infrared ray, as shown in FIG. 2, as a device for emitting electromagnetic energy.

The imaging device 11 is configured to image the interior of the vehicle, in particular the face of the vehicle driver, through the opening 15. The imaging device 11 captures the image by receiving the infrared light reflected by the face of the vehicle driver via a light receiving surface 21 (working end) thereof. In this embodiment, the image acquired by the imaging device 11 is used, for example, to monitor the state of the driver, such as the degree of alertness of the driver. In the present embodiment, as shown in FIG. 2, the imaging device 11 includes an infrared camera 11B that has a camera lens 11A to acquire an image via the light receiving surface 21.

As shown in FIG. 1, the opening 15 of the cover 5 may be provided with a plate-like lid member 23 that covers the retaining member 7, the illuminating device 9, and the imaging device 11 from the inboard side. The lid member 23 preferably serves as an optical filter that transmits preferentially electromagnetic energy emitted from illuminating device 9. In this embodiment, the lid member 23 is configured as a filter (IR filter) that blocks visible light and transmits only infrared light.

As shown in FIG. 1, a mounting portion 27 is provided in a lower end part of the cover 5 to mount a functional member 25 thereon. As shown in FIG. 1, the mounting portion 27 is positioned under the retaining member 7 (or the opening 15), in particular below the imaging device 11, and somewhat offset toward the windshield 4A. In this embodiment, the mounting portion 27 includes an opening penetrating the cover 5, and the functional member 25 consists of a speaker. However, the functional member 25 is not limited to a speaker, but may be, for example, a monitor (digital mirror) that displays the side views of the vehicle S and/or the rear view.

Next, the details of the structure of the retaining member 7 and the positioning of the illuminating device 9 and the imaging device 11 will be described in the following with reference to FIG. 2.

In this embodiment, the retaining member 7 is a molded product made of resin (e.g., ABS resin). As shown in FIG. 2, the retaining member 7 includes a first horizontal wall 31, a first vertical wall 33, a second horizontal wall 35, and a second vertical wall 37 in that order from above.

The first horizontal wall 31 extends from the upper edge of the retaining member 7 or the part thereof adjoining the upper edge of the opening 15 from the outboard direction with a slight downward inclination in the outboard direction. The outer end (the outboard end) of the first horizontal wall 31 coincides with (or is connected to) the upper edge of the first vertical wall 33. The first horizontal wall 31 is thus located on the inboard side (rear) of the first vertical wall 33 in the longitudinal sectional view (FIG. 2) taken along the length of the pillar P.

Figure 2:
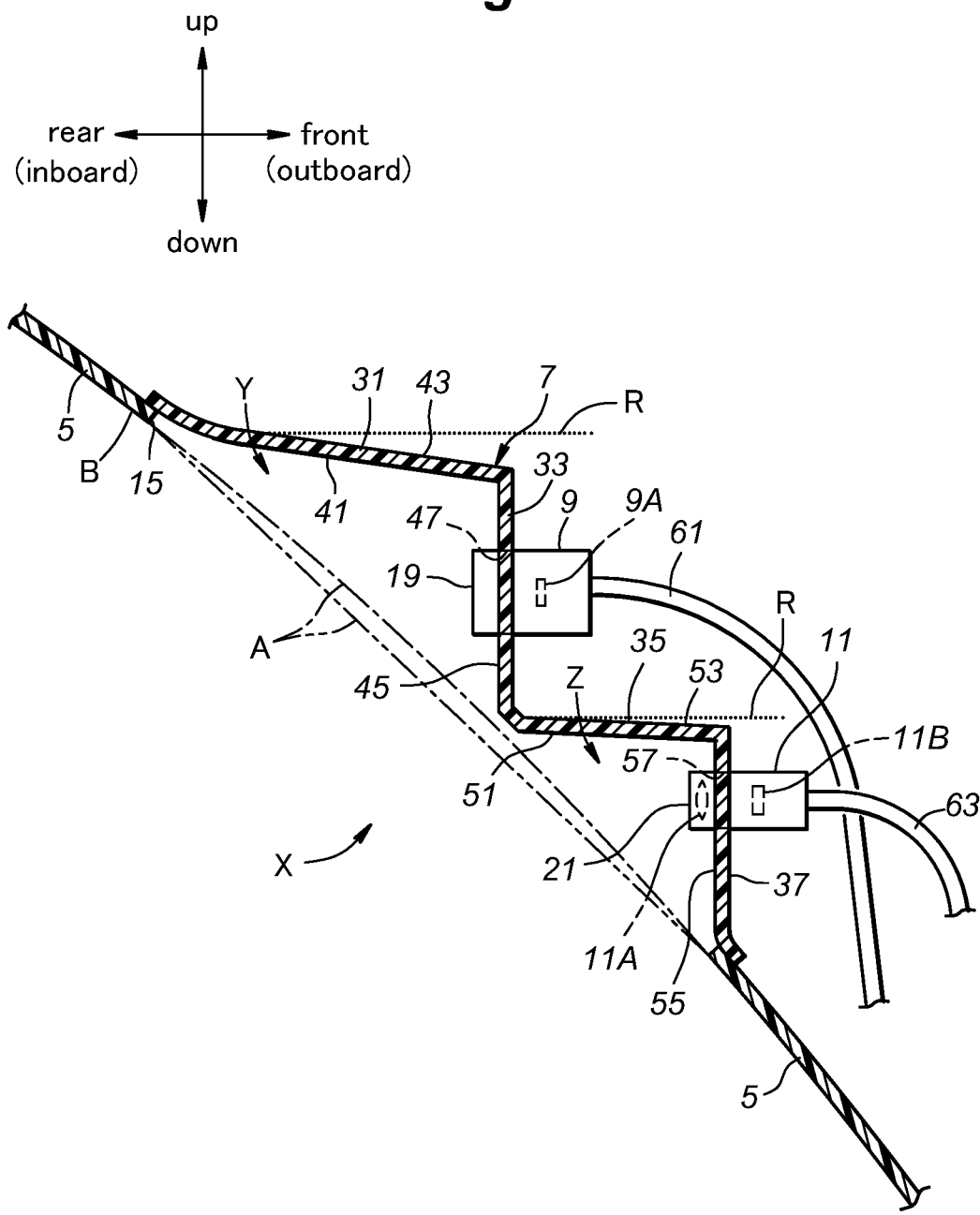
FIG. 2 is a sectional view taken along line II-II in FIG. 2.

Dotted lines in FIG. 2 indicate a horizontal planes R. As can be seen from FIG. 2, the first horizontal wall 31 defines a first upper surface 43 that inclines downward in the outboard direction.

The first vertical wall 33 is located on the outboard side (front) of the first horizontal wall 31, and defines a first vertical surface 45 facing the vehicle cabin. The first vertical wall 33 is provided with a first mounting portion 47. In the present embodiment, the first mounting portion 47 is formed as a through-hole that is passed through the first vertical wall 33. However, the present invention is not limited to this embodiment, and the first mounting portion 47 may also be a recess or a surface configured to retain the illuminating device 9.

The lower edge of the first vertical wall 33 coincides with (or is connected to) the inboard edge of the second horizontal wall 35. The second horizontal wall 35 defines a second upper surface 53 which is slightly inclined downward in the outboard direction.

The outboard edge of the second horizontal wall 35 coincides with (or is connected to) the upper edge of the second vertical wall 37. Thus, the first horizontal wall 31, the first vertical wall 33, the second horizontal wall 35, and the second vertical wall 37 are arranged in an outboard direction in that order, the first horizontal wall 31 being positioned most inboard, and the second vertical wall 37 most outboard. The second vertical wall 37 defines a second vertical surface 55 on the inboard side thereof facing the vehicle interior. The second vertical surface 55 is provided with a second mounting portion 57. In the present embodiment, the second mounting portion 57 is formed as a through-hole that is passed through the second vertical wall 37. However, the present invention is not limited to this embodiment, and the second mounting portion 57 may be a recess that is recessed forward in the second vertical surface 55 or the second vertical surface 55 itself.

The illuminating device 9 is received in the first mounting portion 47 and fixed to the first vertical wall 33 so that the light emitting surface 19 faces the interior (rear) of the vehicle. The imaging device 11 is received in the second mounting portion 57, and fixed to the second vertical wall 37 so that the light receiving surface 21 faces the interior (rear) of the vehicle. Further, by positioning the imaging device 11 and the illuminating device 9 in the first mounting portion 47 and the second mounting portion 57, respectively, the imaging device 11 and the illuminating device 9 can be vertically arranged one above the other with a simple configuration.

As shown in FIG. 2, the light emitting surface 19 is positioned at the rear end of the illuminating device 9 or forms the inboard end of the illuminating device 9. The light receiving surface 21 is positioned at the rear end of the imaging device 11 and forms the inboard end of the imaging device 11. The light receiving surface 21 is positioned below and in front of the light emitting surface 19. Both the illuminating device 9 and the imaging device 11 are positioned forward of an imaginary line A (profile) connecting the upper end of the opening 15 and the lower end of the opening 15 in the longitudinal sectional view of the pillar P. The imaginary line A is a line indicating an outer profile B of the cover 5 (or the pillar A) formed by extrapolating the upper side and the lower side of the opening 15 of the cover 5. The imaginary line A is a curve extending along the outer surface of the cover 5 located above the upper end of the opening 15 and below the lower end of the opening 15 following the general curvature of the pillar P (see the single-dot chain line in FIG. 2). Alternatively, this imaginary line A may be a straight line connecting the upper end and the lower end of the opening 15 (see the double-dot chain line in FIG. 2). Both the illuminating device 9 and the imaging device 11 are positioned inside the outer profile B of the cover 5 (outboard side of the vehicle). Being on the outboard side of the outer profile B of the cover 5 means being on the other side of the imaginary line A away from the interior of the vehicle.

Figure 3:
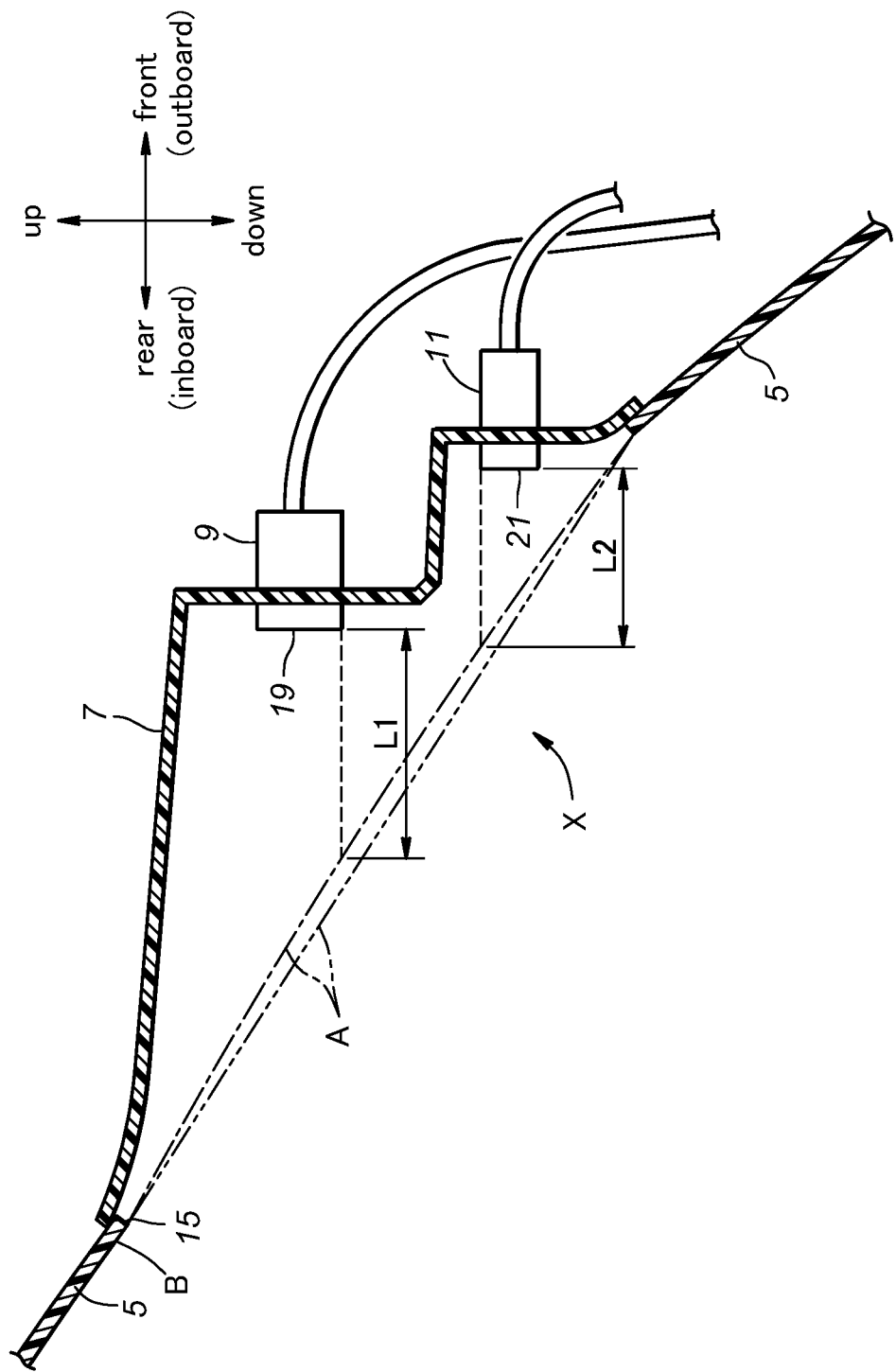
FIG. 3 is a view similar to FIG. 2 showing a modified embodiment of the present invention.

FIG. 3 is a longitudinal sectional view similar to FIG. 2, and shows a mounting structure according to a modified embodiment of the present invention. In FIG. 3, the parts corresponding those shown in FIG. 2 are denoted with like reference numerals without necessarily repeating the description of such parts to avoid redundancy. As shown in FIG. 3, the horizontal distance L1 between the inboard end of the illuminating device 9 and the outer profile B (imaginary line A) of the cover 5 is greater than the horizontal distance L2 between the inboard end of the imaging device 11 and the outer profile B (imaginary line A) of the cover 5. More specifically, the minimum value of the horizontal distance L1 (at the lower end of the light emitting surface 19) is greater than the minimum value of the horizontal distance L2.

In regard to both the embodiments shown in FIGS. 2 and 3, both the first lower surface 41 and the second lower surface 51 are positioned ahead of (on the outboard side of) the imaginary line A in the longitudinal sectional view of the pillar P. As a result, the first horizontal wall 31 and the second horizontal wall 35 are positioned ahead of (on the outboard side of) the imaginary line A in the longitudinal sectional view of the pillar P.

In regard to both the embodiments shown in FIGS. 2 and 3, the light emitting surface 19 located at the inboard end of the illuminating device 9 is located ahead of (on the outboard side of) the imaginary line A, below the first horizontal wall 31, and on the inboard side of the first vertical wall 33. More specifically, the light emitting surface 19 is located in a first opening region Y defined by the first lower surface 41, the first vertical surface 45, and the imaginary line A.

In regard to both the embodiments shown in FIGS. 2 and 3, the light receiving surface 21 located at the inboard end of the imaging device 11 is located ahead of (on the outboard side of) the imaginary line A, below the second horizontal wall 35, and on the inboard side of the second vertical wall 37. More specifically, the light receiving surface 21 is located in a second opening region Z defined by the second lower surface 51, the second vertical surface 55, and the imaginary line A.

A cable (hereinafter referred to as an illuminating device cable 61) is connected to the front end of the illuminating device 9. The illuminating device cable 61 is a cable for supplying electric power to the illuminating device 9. For example, the illuminating device cable 61 has two wires in insulating sheaths corresponding to positive and negative poles of the power source for causing the light emitting diode 9A to emit light. The illuminating device cable 61 extends forward from the front end of the illuminating device 9 and then extends forward and downward along the front surface of the retaining member 7 and the front surface of the cover 5.

A cable (hereinafter referred to as an imaging device cable 63) is connected to the front end of the imaging device 11. The imaging device cable 63 is a cable for supplying power to the imaging device 11 and for transmitting an image acquired by the imaging device 11. In this embodiment, the imaging device cable 63 is formed as a coaxial cable including a plurality of (four in this embodiment) electric wires each provided with an insulating sheath. These individual wires are jointly surrounded by a metal mesh. The imaging device cable 63 extends downward and forward from the front end of the imaging device 11 along the front surface of the retaining member 7 and the front surface of the cover 5.

The pillar body 3 is typically formed by welding together two pieces of stamp formed sheet metal, and has a hollow interior. In such a case, the illuminating device cable 61 and the imaging device cable 63 may be passed through inside the pillar body 3.

Next, the advantages and features of the mounting structure X described above will be discussed in the following.

As shown in FIGS. 1 and 2, the illuminating device 9 and the imaging device 11 are arranged along the length of the pillar body 3. Therefore, compared to the case where the illuminating device 9 and the imaging device 11 are arranged side by side along the horizontal direction, the illuminating device 9 and the imaging device 11 are prevented from projecting sideways from the pillar body 3, in particular toward the front windshield 4A. As a result, the illuminating device 9 and the imaging device 11 can be accommodated within the outer profile of the pillar body 3 without either the illuminating device 9 or the imaging device 11 obstructing the driver's field of vision. Therefore, the mounting structure X according to the present invention improves traffic safety and contributes to the development of sustainable transportation systems.

Since the imaging device 11 and the illuminating device 9 are accommodated within the outer profile of the pillar body 3, in particular the part thereof defined by the imaginary line A. As a result, both the imaging device 11 and the illuminating device 9 do not obstruct the driver's field of view, and do not impair the external appearance of the pillar P.

Since the retaining member 7 is provided with the first vertical wall 33 and the second vertical wall 37, the imaging device 11 and the illuminating device 9 can be fixed to the retaining member 7 with proper aiming directions without any difficulty or any special provisions.

And, owing to the curvature and/or the tilting of the pillar body 3, and the stepped configuration of the first vertical wall 33 and the second vertical wall 37, the illuminating device 9 is positioned nearer to the face of the driver than the imaging device 11 (or the imaging device 11 is positioned farther away from the face of the driver), the field of view of the imaging device 11 can be maximized, and the illumination capability of the illuminating device 9 can be maximized.

The first horizontal wall 31 has a first lower surface 41 that slopes downward toward the outboard side of the vehicle, and the second horizontal wall 35 has a second lower surface 51 that slopes downward toward the outboard side of the vehicle. Therefore, the first lower surface 41 and the second lower surface 51 are inclined upward toward the vehicle interior. Thereby, illumination by the illuminating device 9 is less likely to be obstructed, and the imaging device 11 is less likely to be affected by external spurious light.

The first horizontal wall 31 has a first upper surface 43 that slopes downward toward the outboard side of the vehicle, and the second horizontal wall 35 has a second upper surface 53 that slopes downward toward the outboard side of the vehicle so that, even if moisture should deposit on the surface (first upper surface 43) of the first horizontal wall 31, the moisture is allowed to flow along the first upper surface 43 and falls downward. Similarly, even if moisture should deposit on the upper surface (second upper surface 53) of the second horizontal wall 35, the moisture is allowed to flow along the second upper surface 53 and falls downward. By providing the first upper surface 43 and the second upper surface 53 in this way, it is possible to prevent moisture or any other liquid from accumulating on the upper side of the first horizontal wall 31 and the second horizontal wall 35, so that the inside of the pillar P can be favorably drained.

The imaging device 11 is provided below the illuminating device 9, and the imaging device cable 63 extends downward and forward (outboard) from the imaging device 11. Therefore, as compared to the case where the imaging device 11 is positioned above the illuminating device 9, the length of the imaging device cable 63 can be reduced. Since the imaging device cable 63 is a coaxial cable or other multi-wire cable which is more massive than the cable for the illuminating device cable 61, the material cost and labor cost can be reduced. Furthermore, since the imaging device cable 63 is more susceptible to external noises, it is advantageous to minimize the length of the imaging device cable 63 more than the length of the illuminating device cable 61.

The mounting portion 27 for mounting the functional member 25 is provided ahead or outboard of the cover 5, the illuminating device 9, and the imaging device 11 so that the illuminating device 9, and the imaging device 11 can be positioned closer to the vehicle occupant so that the performance of the illuminating device 9, and the imaging device 11 is not impaired by the presence of the functional member 25. Also, the functional member 25, the illuminating device 9, and the imaging device 11 are vertically aligned along the length of the pillar P, the protrusion from the pillar P can be eliminated or reduced so that the driver's field of view is not reduced, and the external appearance can be enhanced.

The present invention has been described in terms of specific embodiments, but the present invention is not limited by such embodiments and can be modified in various ways without departing from the scope of the present invention.

In the above embodiment, the illuminating device 9 is mounted on the first mounting portion 47, and the imaging device 11 is mounted on the second mounting portion 57 so that the imaging device 11 is positioned below and in front of the illuminating device 9. However, the invention is not limited to this arrangement, but it may be arranged such that the illuminating device 9 is mounted on the second mounting portion 57 and fixed to the second vertical surface 55, and the imaging device 11 is mounted on the first mounting portion 47 and fixed to the second vertical surface 55. In this case, the illuminating device 9 is positioned below and ahead (outboard) of the imaging device 11.

In the above embodiment, both the light emitting surface 19 and the light receiving surface 21 are positioned ahead (outboard) of the imaginary line A when viewed in a longitudinal sectional view of the pillar P, but the present invention is not limited to this embodiment. It suffices if at least one of the light emitting surface 19 and the light receiving surface 21 is positioned ahead (outboard) of the imaginary line A when viewed in a longitudinal sectional view of the pillar P.

In the above embodiment, both the first lower surface 41 and the second lower surface 51 are positioned ahead (outboard) of the imaginary line A in a longitudinal sectional view of the pillar P, but the present invention is not limited to this embodiment. It suffices if at least one of the first lower surface 41 and the second lower surface 51 is positioned ahead (outboard) of the imaginary line A in the cross-sectional view of the pillar.

In the above embodiment, the inboard end of the illuminating device 9 is positioned under the first horizontal wall 31 and on the inboard side of the first vertical wall 33, and the inboard end of the imaging device 11 is positioned under the second horizontal wall 35 and the inboard side of the second vertical wall 37. However, it is within the purview of the present invention that only one of the inboard end of the illuminating device 9 and the inboard end of the imaging device 11 is positioned in this manner.

Further, in the above embodiment, both the first horizontal wall 31 and the second horizontal wall 35 are configured to be positioned within the outer profile B of the cover 5, but it is also possible that only one the first horizontal wall 31 and the second horizontal wall 35 is located within the outer profile B of the cover 5.

Further, in the embodiment shown in FIG. 3, the inboard end of the illuminating device 9 is located above and on the inboard side of the inboard end of the imaging device 11, and the horizontal distance L1 between the inboard end of the illuminating device 9 and the outer profile B of the cover 5 is longer than the horizontal distance L2 between the inboard end of the imaging device 11 and the outer profile B of the cover 5. However, it is also possible that the inboard end of the imaging device 11 is located above and on the inboard side of the inboard end of the illuminating device 9, and the horizontal distance between the inboard end of the imaging device 11 and the outer profile B of the cover 5 is longer than the horizontal distance between the inboard end of the illuminating device 9 and the outer profile B of the cover 5. In other words, it is within the purview of the present invention if one of the inboard ends of the imaging device 11 and the illuminating device 9 is located above and on the inboard side of the vehicle, and the horizontal distance from the outer profile B of the cover 5 to the imaging device 11 or the illuminating device, whichever is located above the other, is greater than the horizontal distance from the outer profile B to the other of the imaging device 11 and the illuminating device.

In the foregoing embodiments, the imaging device 11 and the illuminating device 9 are provided on the A pillar, but the imaging device 11 and the illuminating device 9 may also be mounted on a B pillar, a C pillar, or the like. The retaining member 7 may be formed as either a separate member or an integral part of the cover 5.

Moreover, not all of the constituent elements shown in the above embodiments are essential to the broad concept of the present invention, and they can be appropriately selected, omitted and substituted without departing from the gist of the present invention. The contents of any cited references in this disclosure will be incorporated in the present application by reference.

The invention claimed is:

1. A mounting structure, comprising:
    a cover provided on an inboard side of a pillar of a vehicle, and having an opening facing inboard;
    an illuminating device configured to illuminate interior of the vehicle via the opening; and
    an imaging device configured to capture an image of the interior of the vehicle via the opening,
    wherein the illuminating device and imaging device are provided with respective working ends facing the interior of the vehicle which are positioned one above and inboard of another.

2. The mounting structure according to claim 1, wherein the illuminating device and the imaging device are positioned within an outer profile of the cover.

3. The mounting structure according to claim 1, wherein the cover includes a first vertical wall having a first vertical surface facing inboard, and a second vertical wall having a second vertical surface facing inboard, the second vertical surface being positioned below and outboard of the first vertical surface, one of the illuminating device and the imaging device being provided on the first vertical wall while the other is provided on the second vertical wall.

4. The mounting structure according to claim 3, wherein the cover further includes a first horizontal wall extending inboard from an upper end of the first vertical wall, and a second horizontal wall extending outboard from a lower end of the first vertical wall to an upper end of the second vertical wall.

5. The mounting structure according to claim 4, wherein the first horizontal wall defines a first lower surface that slopes downward toward the first vertical wall, and the second horizontal wall defines a second lower surface that slopes downward toward the second vertical wall.

6. The mounting structure according to claim 4, wherein at least one of the first horizontal wall and the second horizontal wall is contained within an outer profile of the pillar.

7. The mounting structure according to claim 4, wherein the first horizontal wall defines a first upper surface that inclines downward toward the first vertical wall, and the second horizontal wall defines a second upper surface that inclines downward toward the second vertical wall.

8. The mounting structure according to claim 3, wherein the illuminating device is provided on the first vertical wall, and the imaging device is provided on the second vertical wall.

9. The mounting structure according to claim 1, wherein the pillar is an A-pillar.

10. The mounting structure according to claim 1, wherein the cover is provided with a mounting portion configured to mount a functional device to a part of the pillar that is located below the imaging device.

11. The mounting structure according to claim 1, wherein the pillar is curved or tilted so that an upper part of the pillar is more inboard than a lower part thereof.

* * * * *